United States Patent
Kaga et al.

(10) Patent No.: US 7,473,757 B2
(45) Date of Patent: Jan. 6, 2009

(54) HYPERBRANCHED POLYMERS DERIVED FROM ANHYDROSUGAR-RELATED COMPOUNDS AND PROCESS FOR THE PREPARATION THEREOF

(75) Inventors: Harumi Kaga, Sapporo (JP); Toyoji Kakuchi, Sapporo (JP); Toshifumi Satoh, Sapporo (JP); Tomoko Imai, Sapporo (JP)

(73) Assignee: National Institute of Advanced Industrial Science and Technology (JP)

( * ) Notice: Subject to any disclaimer, the term of this patent is extended or adjusted under 35 U.S.C. 154(b) by 628 days.

(21) Appl. No.: 10/768,174

(22) Filed: Feb. 2, 2004

(65) Prior Publication Data

US 2005/0010023 A1 Jan. 13, 2005

(30) Foreign Application Priority Data

Feb. 3, 2003 (JP) .............................. 2003-026406

(51) Int. Cl.
*C08G 59/00* (2006.01)
*C08G 65/00* (2006.01)
(52) U.S. Cl. ..................... 528/418; 528/419; 528/421
(58) Field of Classification Search .................. 528/418
See application file for complete search history.

(56) References Cited

U.S. PATENT DOCUMENTS

2004/0242919 A1* 12/2004 Kunz et al. ................. 560/252

OTHER PUBLICATIONS

Schuerch et. al., J.Am.Chem. Soc. 1959, 81, 4054-4058.*
Toshifumi et. al. Abstracts of Papers, 224th ACS National Meeting, Aug. 2002.*
Satoh et. al. Macromolecules, 1996, 29(21), 6681-6684.*
Kamada et.al. Tetrahedron, 1999, 3667-3669.*

* cited by examiner

*Primary Examiner*—Shaojia Anna Jiang
*Assistant Examiner*—Layla Bland
(74) *Attorney, Agent, or Firm*—Bacon & Thomas, PLLC

(57) ABSTRACT

The hyperbranched polymers are at least one anhydrosugar-related compound selected from the dianhydrosugar alcohol [1]:

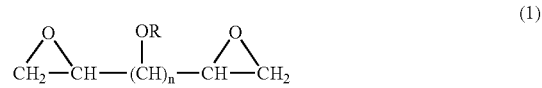

(1)

(wherein R is hydrogen atom or a hydrocarbon group having from 1 to 30 carbon atoms, provided that nR's are equal to or different from one another and at least one R of nR's is hydrogen atom, and symbol n is an integer from 1 to 10) and the anhydrosugar alcohol [2]:

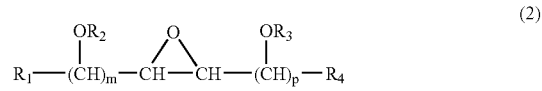

(2)

(wherein each of $R_1$, $R_2$, $R_3$ and $R_4$ is hydrogen atom or a hydrocarbon group having from 1 to 30 carbon atoms; provided that $R_1$, $mR_2$'s, $pR_3$'s and $R_4$ are equal to or different from one another and at least one $R_2$ or $R_3$ of said $mR_2$'s and $pR_3$'s is hydrogen atom, respectively; and symbol m is zero (0) or an integer from 1 to 20 and symbol p is an integer from 1 to 20, provided that symbol m+p is an integer from 1 to 20) or at least one anhydrosugar-related compound selected from the dianhydrosugar alcohol [1] and/or the anhydrosugar alcohol [2] with at least one sugar compound selected from the anhydrosugar as represented by the general formula [3], [4], [5], [6] or [7].

The hyperbranched polymers are readily prepared by polymerizing the dianhydrosugar alcohol or the anhydrosugar [1] or [2] or the dianhydrosugar alcohol or the anhydrosugar [1] or [2] together with the anhydrosugar in the presence of a cationic or anionic initiator.

32 Claims, 3 Drawing Sheets

HYPERBRANCHED POLYMERS DERIVED FROM ANHYDROSUGAR-RELATED COMPOUNDS AND PROCESS FOR THE PREPARATION THEREOF

BACKGROUND OF THE INVENTION

1. Field of the Invention

The present invention relates to hyperbranched polymers useful for a viscosity increasing agent as a biocompatible hydrogel or for a medical material such as an artificial coating agent. The invention also relates to a process for preparing hyperbranched polymers from anhydrosugar-related compounds.

2. Description of the Related Art

A known method for obtaining a hyperbranched carbohydrate polymer includes, for example, the polymerization by the cationic ring cleavage of 1,6-anhydro-β-D-glucopyranose (e.g., Schuerch et al.: J. Am. Chem. Soc., vol. 81, p. 4054, 1959).

This method, however, suffers from the difficulty in controlling a degree of branching and a molecular weight. The resulting hyperbranched carbohydrate polymer is restricted to a sugar having a glucoside linkage composed of a naturally occurring pyranosyl ring. Further, it is difficult to make up a versatile design of hyperbranched carbohydrate polymers including other sugars consisting of furanosyl ring for example or other sugars having no glucoside linkage.

Recently, the synthesis of hyperbranched polyaminosugars by the glycosylation reaction of sugar oxazoline derivatives are reported (Kadokawa, et al.: Angew. Chem. Int. Ed., vol. 37, pp. 2373-2376, 1998; Polym. Adv. Technol., vol. 11, p. 122, 2000). This process is solely applicable to aminosugars and it has the difficulty of the application to other sugars.

SUMMARY OF THE INVENTION

The object of the present invention is to provide hyperbranched polymers derived from anhydrosugar-related compounds.

Another object of the present invention is to provide an effective process for the preparation of the hyperbranched polymers derived therefrom.

In order to achieve the above-mentioned object, the present invention in one aspect provides hyperbranched polymers derived from dianhydrosugar alcohols and/or anhydrosugar alcohols as will be described hereinafter.

The present invention also provides the hyperbranched polymers prepared by the copolymerization of the dianhydrosugar alcohols and/or the anhydrosugar alcohols with anhydrosugars as will be described hereinafter.

The hyperbranched polymer according to the present invention has a degree of branching in the range of 0.05 to 1.00.

The present invention in another aspect provides a method for the preparation of the hyperbranched polymer by polymerizing the dianhydrosugar alcohols and/or anhydrosugar alcohols or copolymerizing dianhydrosugar alcohols and/or anhydrosugar alcohols with the anhydrosugars in the presence of a cationic or anionic initiator.

DESCRIPTION OF THE PREFERRED EMBODIMENTS

The hyperbranched polymer according to one embodiment in the one aspect of the present invention comprises a polymer derived from at least one anhydrosugar-related compound selected from a dianhydrosugar alcohol represented by the following general formula [1]:

(1)

(wherein R is hydrogen atom or a hydrocarbon group having 1 to 30 carbon atoms, provided that nR's are equal to or different from one another and at least one R of nR's is hydrogen atom, and symbol n is an integer from 1 to 10) and an anhydrosugar alcohol represented by the following general formula [2]:

(2)

(wherein $R_1$ is hydrogen atom or a hydrocarbon group having from 1 to 30 carbon atoms; $R^2$ is hydrogen atom or a hydrocarbon group having from 1 to 30 carbon atoms; $R_3$ is hydrogen atom or a hydrocarbon group having from 1 to 30 carbon atoms; and $R_4$ is hydrogen atom or a hydrocarbon group having from 1 to 30 carbon atoms; provided that $R_1$, $mR_2$'s, $pR_3$'s and $R_4$ are equal to or different from one another and at least one $R_2$ or $R_3$ of said $mR_2$'s and $pR_3$'s is hydrogen atom, respectively; and symbol m is zero (0) or an integer from 1 to 20 and symbol p is an integer from 1 to 20, provided that symbol m+p is an integer from 1 to 20).

The hyperbranched polymer according to another embodiment in this aspect of the present invention comprises a polymer of at least one anhydrosugar-related compound selected from the dianhydrosugar alcohol represented by the following general formula [1]:

(1)

(wherein R is hydrogen atom or a hydrocarbon group having from 1 to 30 carbon atoms, provided that nR's are equal to or different from one another and at least one R of nR's is hydrogen atom, and symbol n is an integer from 1 to 10) and an anhydrosugar alcohol represented by the following general formula [2]:

(wherein $R_1$ is hydrogen atom or a hydrocarbon group having from 1 to 30 carbon atoms; $R_2$ is hydrogen atom or a hydrocarbon group having from 1 to 30 carbon atoms; $R_3$ is hydrogen atom or a hydrocarbon group having from 1 to 30 carbon atoms; and $R_4$ is hydrogen atom or a hydrocarbon group having from 1 to 30 carbon atoms; provided that $R_1$, $mR_2$'s, $pR_3$'s and $R_4$ are equal to or different from one another and at least one $R_2$ or $R_3$ of said $mR_2$'s and $pR_3$'s is hydrogen atom, respectively; and symbol m is zero (0) or an integer from 1 to 20 and symbol p is an integer from 1 to 20, provided that symbol m+p is an integer from 1 to 20) with at least one sugar compound selected from an anhydrosugar as represented by the following general formula [3]:

by the following general formula [4]:

by the following general formula [5]:

by the following general formula [6]:

or by the following general formula [7]:

(wherein $R^5$, $R^6$ and $R^7$ may be each equal to or different from one another and each is hydrogen atom or a hydrocarbon group having 1 to 30 carbon atoms).

The hydrocarbon group as used herein may include a linear hydrocarbon group or a cyclic hydrocarbon group. The linear hydrocarbon group may include, for example, a linear or branched hydrocarbon group derived from an aliphatic hydrocarbon, such as an alkyl group having from 1 to 30 carbon atoms, preferably from 1 to 4 carbon atoms, and an alkenyl group having from 2 to 30 carbon atoms, preferably from 2 to 5 carbon atoms. The alkyl group may include, for example, methyl, ethyl, propyl, butyl, iso-propyl, tert-butyl, pentyl and hexyl. The alkenyl group may include, for example, ethenyl, propenyl, butenyl, iso-propenyl, pentenyl and hexenyl. The cyclic hydrocarbon group derived from an alicyclic hydrocarbon group or an aromatic hydrocarbon group. The alicyclic hydrocarbon group may include, for example, a cycloalkyl group or a cycloalkenyl group, each having from 3 to 30 carbon atoms, preferably from 5 to 7 carbon atoms. The cycloalkyl group may include, for example, cyclopropyl, cyclobutyl, cyclopentyl, cyclo(methyl)pentyl, cyclohexyl, cyclo(methyl)hexyl and cycloheptyl. The cycloalkenyl group may include, for example, cyclopropenyl, cyclobutenyl, cyclopentenyl, cyclo(methyl)pentenyl, cyclohexenyl, cyclo(methyl)hexenyl and cycloheptenyl. The aromatic hydrocarbon group may include an aryl group and an aralkyl group. The aryl group may have from 6 to 30 carbon atoms, preferably from 6 to 12 carbon atoms, and the aralkyl group may have from 7 to 30 carbon atoms, preferably from 7 to 10 carbon atoms. The aryl group may include, for example, phenyl, cumenyl, mesityl, tolyl and xylyl. The aralkyl group may include, for example, benzyl and phenethyl.

Among the hydrocarbon groups as defined herein, the hydrocarbon group selected from the alkyl group, the aryl group and the aralkyl group is preferred.

In the general formula [1], the symbol n is an integer from 1 to 10 carbon atoms, preferably from 1 to 4.

In the general formula [1], at least one R of nR's is hydrogen atom that is involved in the polymerization of the dianhydrosugar alcohol and assists in increasing a degree of branching for the resulting hyperbranched polymer.

Examples of the dianhydrosugar alcohols [1] may include a 1,2:5,6-dianhydro-D-mannitol-type compound, a 1,2:5,6-dianhydro-L-iditol-type compound, a 1,2:5,6-dianhydro-annitol-type compound, a 1,2:5,6-dianhydro-galactitol-type compound, a 1,2:5,6-dianhydro-glucitol-type compound, a 1,2:4,5-dianhydro-xylitol-type compound, and the like.

In the general formula [2], the symbol m is zero (0) or an integer from 1 to 20, preferably zero (0) or an integer from 1 to 4, and, likewise, the symbol p is an integer from 1 to 20, preferably an integer from 1 to 4, however, provided that the symbol m+p is an integer from 1 to 20.

Further, at least one $R_2$ or $R_3$ of $mR_2$'s and $pR_3$'s is hydrogen atom that is involved in the polymerization of the anhydrosugar alcohol [2] and assists in increasing the degree of branching of the resulting hyperbranched polymer.

Examples of the anhydrosugar alcohol [2] may include a 1,2-anhydro-D-mannitol-type compound, a 1,2-anhydro-L-iditol-type compound, a 1,2-anhydro-annitol-type compound, a 1,2-anhydro-galactitol-type compound, a 1,2-anhydro-glucitol-type compound, a 1,2-anhydro-xylitol-type compound, a 1,2-anhydro-threitol-type compound, and the like.

In each of the general formulas [3], [4], [5], [6] and [7], $R^5$, $R^6$ and $R^7$ define each hydrogen atom and a hydrocarbon group having from 1 to 30 carbon atoms. The hydrocarbon group as defined in each of the general formulas [3], [4], [5], [6] and [7] has the meaning identical to that as defined in the general formula [1] or [2].

In another aspect of the present invention, there is provided a process for the preparation of the hyperbranched polymer, which comprises polymerization of at least one anhydrosugar-related compound selected from the dianhydrosugar alcohols [1] and the anhydrosugar alcohols [2] or copolymerization of at least one anhydrosugar-related compound selected from the dianhydrosugar alcohols [1] and/or the anhydrosugar alcohols [2] with at least one anhydrosugar selected from the following general formula [3], [4], [5], [6] or [7] in the presence of the cationic or anionic initiator.

As the cationic initiator to be used for the process according to the present invention, there may be used any one customarily used for the polymerization of the anhydrosugar-related compounds as described above. Examples of the cationic initiators may include, for example, a thermal cationic initiator and an photocationic initiator including such as sulfonium antimonate and the like, a Lewis acid such as boron trifluoride diethyl etherate, tin tetrachloride, antimony pentachloride, phosphorus pentafluoride and the like, a Brenstead acid such as trifluoromethane sulfonic acid, and the like.

As the anionic initiator, there may be used any one customarily used, and examples of the anionic initiators may include and not be limited to a hydroxide such as KOH and the like, and a metal alcolate such as tert-BuOK, $Zn(OCH_3)_2$ and the like.

The amount of the initiators may be in the range of 1 to 10% by weight with respect to the anhydrosugar-related compound as a starting material.

The polymerization reaction to be used for the method of the present invention may be carried out in the presence of an organic solvent, such as tetrahydrofuran, dichloromethane, propylene carbonate, and the like.

The polymerization of the dianhydrosugar alcohol [1] according to the method of the present invention will be described as a reference to the mechanism of the polymerization. The polymerization of the dianhydrosugar alcohol represented by the general formula [1] to be used as a starting material may involve the ring-opening and the ring-forming by the nucleophillic or electrophillic reaction. The reaction of an anhydro group with a hydroxyl group in other anhydrosugar can form a hyperbranched carbohydrate polymer consisting of a recurring unit without glycoside linkage, which does not occur naturally.

In the case where the anhydrosugar alcohol as represented by the general formula [2] is used, the anhydro groups at the 1,2-, 1,4-, 1,5-, 2,3- or 3,5-positions may be cleaved by the hydroxyl group of the other sugar, thereby forming a highly branched polyether structure, that is, hyperbranched polyether.

Further, when the dianhydrosugar alcohol [1] is admixed with the anhydrosugar alcohol [2], the polymerization reaction of the anydrosugar alcohols of the general formulas [1] and [2] are allowed to occur simultaneously yielding a polymer that contains both of the hyperbranched carbohydrate and the hyperbranched polyether structure.

The chemical structure of the dianhydrosugar alcohol (n=2) of the general formula [1] may be represented by the general formula (a):

The polymer of the anhydrosugar alcohol ($R_1=R_4=H$, m=p=2) of the general formula [2] may be represented by the general formula (b):

The hyperbranched polymer according to the present invention has the degree of branching in the range of 0.05 to 1.00, when measured by the following Frechet's formula:

Degree of branching=(number of branched units+ number of polymer terminals)/(number of branched units+number of polymer terminals+ number of linear units).

The Frechet's formula can give the degree of branching of zero (0) for a linear polymer and the degree of branching of one (1) for a dendrimer.

The hyperbranched polymer according to the present invention may be in a shape close to a dendritic form and have further branches from the branched chain. The hyperbranched polymer according to the present invention may include a carbohydrate polymer composed of unique and non-naturally occurring recurring units having no glycoside linkage, that is, a franose-type sugar unit.

The hyperbranched polymer comprising the dianhydrosugar alcohols [1] and/or the anhydrosugar alcohols [2] may have a molecular weight in the range of normally 10,000 or more, preferably 200,000 or more, when measured by the static laser light scattering method.

The present invention will be described in more detail by way of examples, although it is not limited to such examples.

EXAMPLE 1

Cationic Polymerization of 1,2:5,6-dianhydro-D-mannitol

To a solution of 1,2:5,6-dianhydro-D-mannitol (0.50 g) in dry dichloromethane ($CH_2Cl_2$) (6.8 mL) was added boron trifluoride diethyl etherate ($BF_3.OEt_2$)(4.3 µL) at 0° C. under a nitrogen atmosphere. After 200 hours, the reaction mixture was poured into a large amount of methanol and neutralized with aqueous ammonia. The solvent was evaporated, and the residue was purified using a permeable membrane in the water to give the polymer 0.209 g (41.8% yield). The $M_{w,SEC}$ and $M_w/M_n$ were 1,900 and 2.23, respectively, and the $M_{w,SLS}$ was $3.1 \times 10^5$ in aqueous sodium nitrate solution (0.2 mol·L$^{-1}$). The inertial and hydrodynamic radii of the polymer were 83 nm (SLS) and 67 nm (DLS), respectively, at 40° C. in aqueous sodium nitrate solution (0.2 mol·L$^{-1}$). The polymer was soluble in water, methanol, and acetone and insoluble in dichloromethane, chloroform, tetrahydrofuran, toluene, and pyridine.

Figure 1:
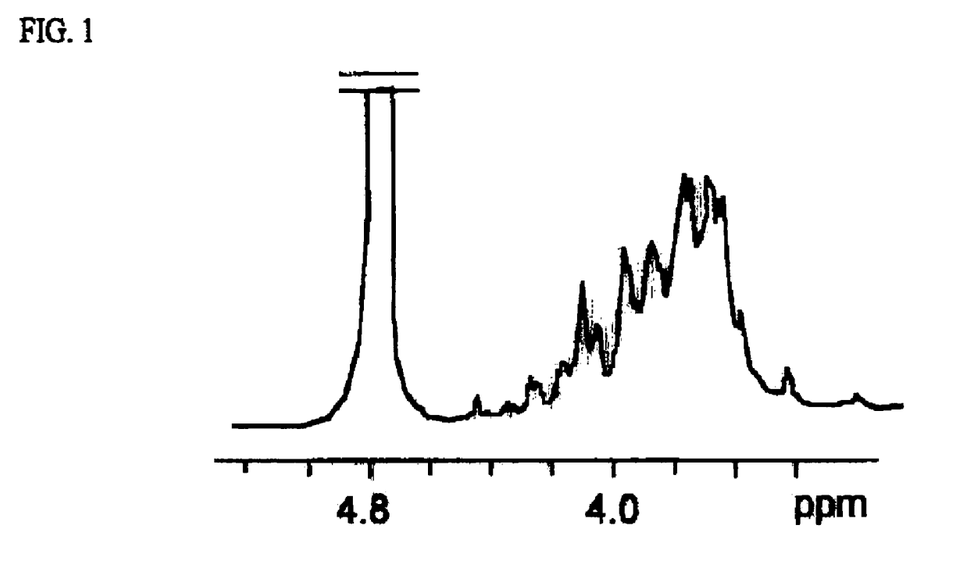
FIG. 1 is a diagram showing a spectrum of the hyperbranched carbohydrate polymer of Example 1 measured at 400 MHz and $^1$HNMR (solvent: deuterium water, 25 fC).
Figure 2:
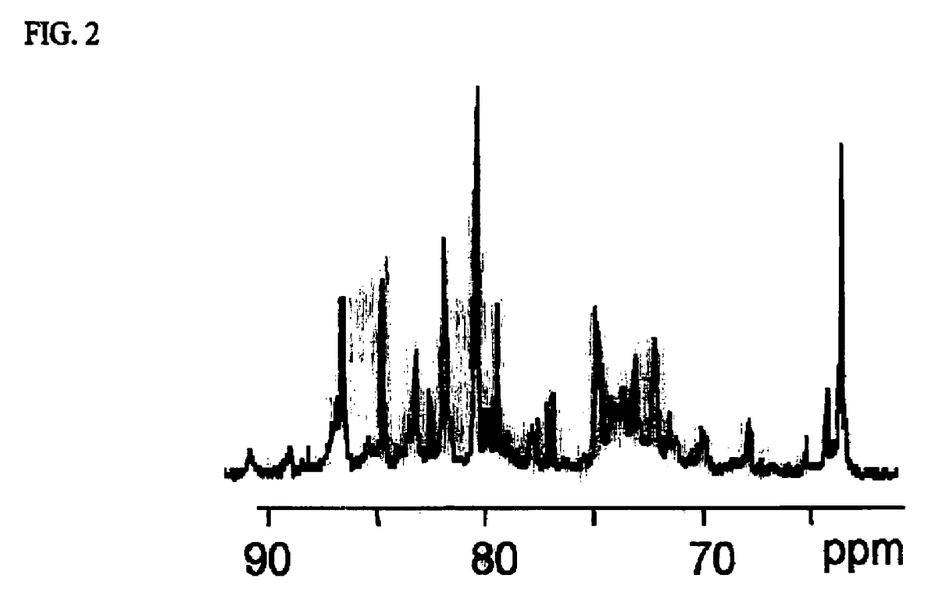
FIG. 2 is a diagram showing a spectrum of the hyperbranched carbohydrate polymer of Example 1 measured at 400 MHz and $^{13}$CNMR (solvent: deuterium water, 25 fC).

The $^1$H NMR and $^{13}$C NMR spectra of the polymer are shown in FIG. 1 and FIG. 2, respectively. For the linear carbohydrate polymers, a peak derived from the C1 carbon terminal was little demonstrated, while a large peak (nearby 60 ppm) derived from the C1 carbon terminal of the carbohydrate polymer according to the present invention was demonstrated. Moreover, the peak derived from the other carbon is divided into several peaks so that it is found to be in a hyperbranched structure. It was also found that the weight-average molecular weight measured by the SEC ($M_{w,SEC}$) was demonstrated smaller than the weight-average molecular weight measured by the static laser light scattering method ($M_{w,SLS}$). This tendency seems to be based on the difference of the effective volume of the polymer and it can often be observed in the hyperbranched polymer.

EXAMPLE 2

Anionic Polymerization of 1,2:5.6-anhydro-D-mannitol

Figure 3:
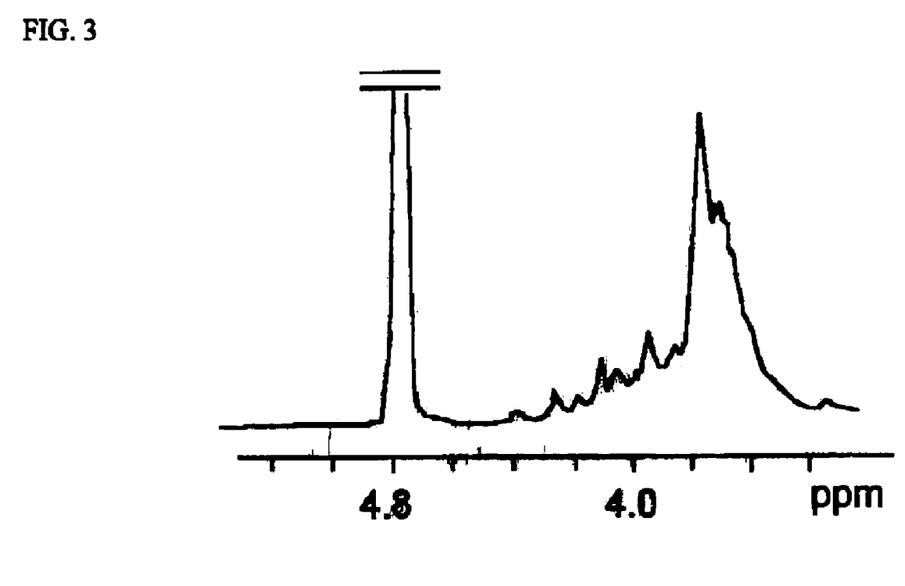
FIG. 3 is a diagram showing a spectrum of the hyperbranched carbohydrate polymer of Example 2 measured at 400 MHz and $^1$HNMR (solvent: deuterium water, 25 fC).
Figure 4:
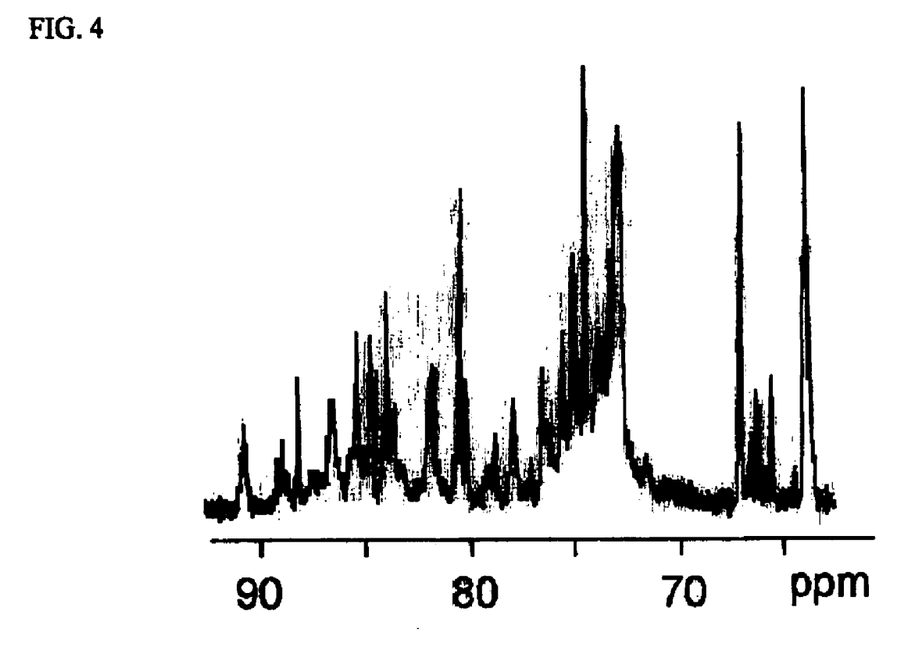
FIG. 4 is a diagram showing a spectrum of the hyperbranched carbohydrate polymer of Example 2 measured at 400 MHz and $^{13}$CNMR (solvent: deuterium water, 25 fC).

To a solution of 1,2:5,6-dianhydro-D-mannitol (0.50 g) in dry THF (3.4 mL) was added t-BuOK/THF solution (0.17 mL, 1.0 mol·L$^{-1}$) under a nitrogen atmosphere. After 30 hours, the reaction mixture was poured into a large amount of methanol and neutralized with aqueous dry ice. The solvent was evaporated, and the residue was purified using a permeable membrane in water to give the polymer 0.085 g (17.0% yield); a specific rotation+19.6f (c 1.0, $H_2O$, 23 fC). The $M_{w,SEC}$ and $M_w/M_n$ were 1,600 and 5.07, respectively, and the $M_{w,SLS}$ was $13.1 \times 10^5$ in aqueous sodium nitrate solution (0.2 mol·L$^{-1}$). The inertial and hydrodynamic radii of the polymer were 131 nm (SLS) and 132 nm (DLS), respectively, at 40° C. in aqueous sodium nitrate solution (0.2 mol·L$^{-1}$). The $^1$H NMR and $^{13}$C NMR spectra of the polymer are shown in FIG. 3 and FIG. 4, respectively.

EXAMPLE 3

Cationic Polymerization of 2,3-anhydro-erythritol

To 2,3-anhydroerythritol (1.0 g) was added $BF_3.OEt_2$ (6.2 µL) at 100° C. under a nitrogen atmosphere. After 120 h, the reaction mixture was poured into a large amount of water and neutralized with aqueous ammonia. The solvent was evaporated, and the residue was purified using a permeable membrane in water to give the polymer 0.294 g (29.4% yield). The $M_{w,SEC}$ and $M_{w,SLS}$ were 970 and $13.1 \times 10^5$, respectively, in aqueous sodium nitrate solution (0.2 mol·L$^{-1}$). The inertial radius of the polymer was 116 nm (SLS) at 40° C. in aqueous sodium nitrate solution (0.2 mol·L$^{-1}$). The polymer was soluble in water and methanol, and insoluble in acetone, dichloromethane, chloroform, tetrahydrofuran, toluene, and pyridine.

Figure 5:
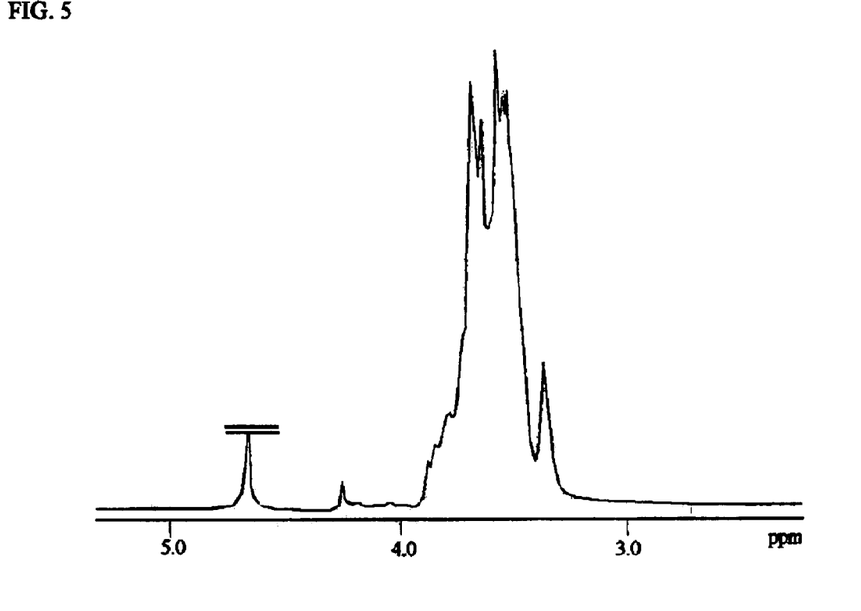
FIG. 5 is a diagram showing a spectrum of the hyperbranched polyether of Example 3 measured at 400 MHz and $^1$HNMR (solvent: deuterium water, 25 fC).
Figure 6:
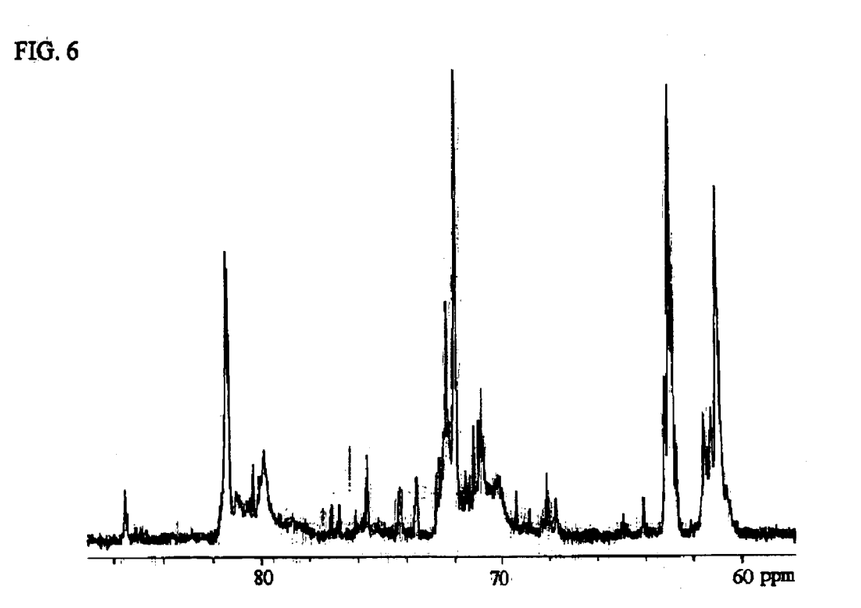
FIG. 6 is a diagram showing a spectrum of the hyperbranched polyether of Example 3 measured at 400 MHz and $^{13}$CNMR (solvent: deuterium water, 25 fC).

The $^1$H NMR and $^{13}$C NMR spectra of the polymer are shown in FIG. 5 and FIG. 6, respectively.

For the carbohydrate polymers according to the present invention, a peak derived from the C3 terminal carbon for the linear carbohydrate polymer was observed slightly, while a large peak (nearby 70 ppm) derived from the C3 terminal carbon was observed in the hyperbranched carbohydrate polymer. Moreover, the peak derived from the other carbon is divided into several peaks so that it is found to be in a hyperbranched structure. It was also found that the weight-average molecular weight measured by the SEC ($M_{w,SEC}$) was smaller than the weight-average molecular weight measured by the static laser light scattering method ($M_{w,SLS}$). This tendency seems to be based on the difference of the effective volume of the polymer and it can often be observed in the hyperbranched polymer.

EXAMPLE 4

Cationic Copolymerization of 1,2:5,6-dianhydro-D-mannitol with 1,6-anhydro-α-D-mannopyranose To a solution of 2,3-anhydroerythritol (1.0 g, 10 mmol) and 1,6-anhydro-β-D-mannopyranose (0.162 g, 1 mmol) in propylene carbonate (2.5 ml) at 130° C. was added 2-butenyl-tetramethylenesulfonium hexafluoroantimonate in propylene carbonate solution (9.4 µL, $3.76 \times 10^{-2}$ mmol) under a nitrogen atmosphere. After 192 hours, the reaction mixture was poured into a large amount of water and neutralized with aqueous ammonia. The solvent was evaporated, and the residue was purified using a permeable membrane in water to give the polymer 0.304 g (26.2% yield). The $M_{w,SEC}$ and $M_{w,SLS}$ were 1,200 and $7.3 \times 10^5$, respectively, in aqueous sodium nitrate solution (0.2 mol·L$^{-1}$).

EFFECTS OF THE INVENTION

The present invention can provide the synthesis of a water-soluble hyperbranched polymer with high reproducivity and on a large scale, allowing the use of the hyperbranched polymer as a functional material on an industrial scale. Moreover, the present invention can produce a hyperbranched carbohydrate polymer having a structure that cannot be obtained from a natural branched carbohydrate polymer, such as amylopectin or the like, and further provide the hyperbranched carbohydrate and/or polyether or mix of both structures that can be controlled a molecular weight and a degree of branching so as to comply with usage.

Further, the hyperbranched polymer according to the present invention can be applicable to medical materials such as a biocompatible hydrogel for a viscosity increasing agent or an artificial coating agent, and the like.

What is claimed is:

1. A hyperbranched polymer of at least one anhydrosugar-related compound selected from a dianhydrosugar alcohol represented by the following general formula [1]:

(1)

(wherein R is hydrogen atom or a hydrocarbon group having from 1 to 30 carbon atoms, provided that nR's are equal to or different from one another and at least one R of nR's is hydrogen atom, and symbol n is an integer from 1 to 10) and an anhydrosugar alcohol represented by the following general formula [2]:

(2)

(wherein $R_1$ is hydrogen atom or a hydrocarbon group having from 1 to 30 carbon atoms; $R_2$ is hydrogen atom or a hydrocarbon group having from 1 to 30 carbon atoms; $R_3$ is hydrogen atom or a hydrocarbon group having from 1 to 30 carbon atoms; and $R_4$ is hydrogen atom or a hydrocarbon group having from 1 to 30 carbon atoms; provided that $R_1$, $mR_2$'s, $pR_3$'s and $R_4$ are equal to or different from one another and at least one of $R_2$ or $R_3$ of said $mR_2$'s and $pR_3$'s is hydrogen atom, respectively; and symbol m is an integer from 1 to 20 and symbol p is an integer from 1 to 20, provided that symbol m+p is an integer from 2 to 20.

2. A hyperbranched copolymer of:

I. at least one anhydrosugar-related compound selected from a dianhydrosugar alcohol represented by the following general formula [1]:

(1)

(wherein R is hydrogen atom or a hydrocarbon group having from 1 to 30 carbon atoms, provided that nR's are equal to or different from one another and at least one R of nR's is hydrogen atom, and symbol n is an integer from 1 to 10) and an anhydrosugar alcohol represented by the following general formula [2]:

(2)

(wherein $R_1$ is hydrogen atom or a hydrocarbon group having from 1 to 30 carbon atoms; $R_2$ is hydrogen atom or a hydrocarbon group having from 1 to 30 carbon atoms; $R_3$ is hydrogen atom or a hydrocarbon group having from 1 to 30 carbon atoms; and $R_4$ is hydrogen atom or a hydrocarbon group having from 1 to 30 carbon atoms; provided that $R_1$, $mR_2$'s, $pR_3$'s and $R_4$ are equal to or different from one another and at least one of $R_2$ or $R_3$ of said $mR_2$'s and $pR_3$'s is hydrogen atom, respectively; and symbol m is an integer from 1 to 20 and symbol p is an integer from 1 to 20, provided that symbol m+p is an integer from 2 to 20); and II. at least one sugar compound selected from the group consisting of:

anhydrosugars represented by the following general formula [3]:

(3)

anhydrosugars represented by the following general formula [4]:

(4)

anhydrosugars represented by the following general formula [5]:

(5)

anhydrosugars represented by the following general formula [6]:

(6)

and anhydrosugars represented by the following general formula [7]:

(7)

(wherein $R^5$ is hydrogen atom or a hydrocarbon group having from 1 to 30 carbon atoms; $R^6$ is hydrogen atom or a hydrogen group having from 1 to 30 carbon atoms; and $R^7$ is hydrogen atom or a hydrocarbon group having 1 to 30 carbon atoms; provided that $R^5$, $R^6$ and $R^7$ are equal to or different from one another).

3. The hyperbranched polymer as claimed in claim 1 wherein said hydrocarbon group is an alkyl group having from 1 to 30 carbon atoms, an aryl group having from 6 to 30 carbon atoms or an arylalkyl group having from 7 to 30 carbon atoms.

4. The hyperbranched polymer as claimed in claim 1 wherein said hydrocarbon group is an alkyl group having from 1 to 4 carbon atoms, an aryl group having from 6 to 12 carbon atoms or an arylalkyl group having from 7 to 10 carbon atoms.

5. The hyperbranched polymer as claimed in claim 1 comprising at least one dianhydrosugar alcohol selected from the group consisting of 1,2:5,6-dianhydro-D-mannitol, 1,2:5,6-dianhydro-L-iditol, 1,2:5,6-dianhydro-galactitol, 1,2:5,6-dianhydro-glucitol and 1,2:4,5-dianhydro-xylitol.

6. The hyperbranched polymer as claimed in claim 1 wherein a degree of branching is from 0.05 to 1.00.

7. The hyperbranched polymer as claimed in claim 1 wherein a degree of branching is from 0.45 to 1.00.

8. A process for the preparation of a hyperbranched polymer according to claim 1 comprising polymerizing at least one anhydrosugar-related compound selected from a dianhydrosugar alcohol represented by the following general formula [1]:

(1)

(wherein R is hydrogen atom or a hydrocarbon group having from 1 to 30 carbon atoms, provided that nR's are equal to or different from one another and at least one R of nr's is hydrogen atom, and symbol n is an integer from 1 to 10)
and an anhydrosugar alcohol represented by the following general formula [2]:

(2)

(wherein $R_1$ is hydrogen atom or a hydrocarbon group having from 1 to 30 carbon atoms; $R_2$ is hydrogen atom or a hydrocarbon group having from 1 to 30 carbon atoms; $R_3$ is hydrogen atom or a hydrocarbon group having from 1 to 30 carbon atoms; and $R_4$ is hydrogen atom or a hydrocarbon group having from 1 to 30 carbon atoms; provided that $R_1$, $mR_2$'s, $pR_3$'s and $R_4$ are equal to or different from one another and at least one of $R_2$ or $R_3$ of said $mR_2$'s and $pR_3$'s is hydrogen atom, respectively; and symbol m is an integer from 1 to 20 and symbol p is an integer from 1 to 20, provided that symbol m+p is an integer from 2 to 20, in the presence of a cationic initiator or anionic initiator.

9. A process for the preparation of a hyperbranched copolymer according to claim 2 comprising copolymerizing:

I. at least one anhydrosugar-related compound selected from a dianhydrosugar alcohol represented by the following general formula [1]:

(1)

(wherein R is hydrogen atom or a hydrocarbon group having from 1 to 30 carbon atoms, provided that nR's are equal to or different from one another and at least one R of nr's is hydrogen atom, and symbol n is an integer from 1 to 10)
and an anhydrosugar alcohol represented by the following general formula [2]:

(2)

(wherein $R_1$ is hydrogen atom or a hydrocarbon group having from 1 to 30 carbon atoms; $R_2$ is hydrogen atom or a hydrocarbon group having from 1 to 30 carbon atoms; $R_3$ is hydrogen atom or a hydrocarbon group having from 1 to 30 carbon atoms; and $R_4$ is hydrogen atom or a hydrocarbon group having from 1 to 30 carbon atoms; provided that $R_1$, $mR_2$'s, $pR_3$'s and $R_4$ are equal to or different from one another and at least one of $R_2$ or $R_3$ of said $mR_2$'s and $pR_3$'s is hydrogen atom, respectively; and symbol m is an integer from 1 to 20 and symbol p is an integer from 1 to 20, provided that symbol m+p is an integer from 2 to 20); and

II. at least one sugar compound selected from the group consisting of:

anhydrosugars represented by the following general formula [3]:

(3)

anhydrosugars represented by the following general formula [4]:

(4)

anhydrosugars represented by the following general formula [5]:

(5)

anhydrosugars represented by the following general formula [6]:

(6)

and anhydrosugars represented by the following general formula [7]:

(7)

(wherein $R^5$ is hydrogen atom of a hydrocarbon group having from 1 to 30 carbon atoms; $R^6$ is hydrogen atom or a hydrogen group having from 1 to 30 carbon atoms; and $R^7$ is hydrogen atom or a hydrocarbon group having 1 to 30 carbon atoms; provided that $R^5$, $R^6$ and $R^7$ are equal to or different from one another), in the presence of a cationic initiator or an anionic initiator.

10. The method for the preparation of the hyperbranched polymer as claimed in claim 8 wherein said hydrocarbon group is an alkyl group having from 1 to 4 carbon atoms, an aryl group having from 6 to 12 carbon atoms or an arylalkyl group having from 7 to 10 carbon atoms.

11. The method for the preparation of the hyperbranched polymer as claimed in claim 8 wherein said dianhydrosugar alcohol is at least one member selected from the group consisting of 1,2;5,6-dianhydro-D-mannitol, 1,2:5,6-dianhydro-L-iditol, 1,2:5,6-dianhydro-galactitol, 1,2:5,6-dianhydro-glucitol and 1,2:4,5-dianhydro-xylitol.

12. The method for the preparation of the hyperbranched polymer as claimed in claim 8 wherein said cationic initiator is a thermal cationic initiator, a photo cationic initiator, a Lewis acid or a Brenstead's acid.

13. The method for the preparation of the hyperbranched polymer as claimed in claim 8, wherein said cationic initiator is sulphonium antimonate, boron trifluoride diethyl etherate, tin tetrachloride, antimony pentachloride, phosphorus pentachloride or trifluoromethane sulfonic acid.

14. The method for the preparation of the hyperbranched polymer as claimed in claim 8, wherein said anionic initiator is a hydroxide or a metal alcolate.

15. The method for the preparation of the hyperbranched polymer as claimed in claim 8, wherein said anionic initiator is KOH, tert-BuOK or $Zn(OCH_3)_2$.

16. The method for the preparation of the hyperbranched polymer as claimed in claim 8, wherein said cationic initiator or said anionic initiator is 1-10% by weight of the anhydrosugar-related compound.

17. The method for the preparation of the hyperbranched polymer as claimed in claim 8, wherein a degree of branching is from 0.05 to 1.00.

18. The method for the preparation of the hyperbranched polymer as claimed in claim 8, wherein a degree of branching is from 0.45 to 1.00.

19. The method for the preparation of the hyperbranched polymer as claimed in claim 9 wherein said cationic initiator is a thermal cationic initiator, a photo cationic initiator, a Lewis acid or a Brenstead's acid.

20. The method for the preparation of the hyperbranched polymer as claimed in claim 9, wherein said cationic initiator is sulphonium antimonate, boron trifluoride diethyl etherate, tin tetrachloride, antimony pentachioride, phosphorus pentachloride or trifluoromethane sulfonic acid.

21. The method for the preparation of the hyperbranched polymer as claimed in claim 9, wherein said anionic initiator is a hydroxide or a metal alcolate.

22. The method for the preparation of the hyperbranched polymer as claimed in claim 9, wherein said anionic initiator is KOH, tert-BuOK or $Zn(OCH_3)_2$.

23. The method for the preparation of the hyperbranched polymer as claimed in claim 9, wherein said cationic initiator or said anionic initiator is 1-10% by weight of the anhydrosugar-related compound.

24. The hyperbranched polymer as claimed in claim 2 wherein said hydrocarbon group is an alkyl group having from 1 to 30 carbon atoms, an aryl group having from 6 to 30 carbon atoms or an arylalkyl group having from 7 to 30 carbon atoms.

25. The hyperbranched polymer as claimed in claim 2 wherein said hydrocarbon group is an alkyl group having from 1 to 4 carbon atoms, an aryl group having from 6 to 12 carbon atoms or an arylalkyl group having from 7 to 10 carbon atoms.

26. The hyperbranched polymer as claimed in claim 2 comprising at least one dianhydrosugar alcohol selected from the group consisting of 1,2:5,6-dianhydro-D-mannitol, 1,2:5,6-dianhydro-L-iditol, 1,2:5,6-dianhydro-galactitol, 1,2:5,6-dianhydro-glucitol and 1,2:4,5-dianhydro-xylitol.

27. The hyperbranched polymer as claimed in claim 2 wherein a degree of branching is from 0.05 to 1.00.

28. The hyperbranched polymer as claimed in claim 2 wherein a degree of branching is from 0.45 to 1.00.

29. The hyperbranched polymer as claimed in claim 1 having a molecular weight of at least 10,000 when measured by the static light scattering method.

30. The hyperbranched polymer as claimed in claim 1 having a molecular weight of at least 200,000 when measured by the static light scattering method.

31. The hyperbranched polymer as claimed in claim 1 having the structure:

(a)

32. The hyperbranched polymeras claimed in claim 1 having the structure:

(b)

* * * * *

UNITED STATES PATENT AND TRADEMARK OFFICE
CERTIFICATE OF CORRECTION

PATENT NO. : 7,473,757 B2
APPLICATION NO. : 10/768174
DATED : January 6, 2009
INVENTOR(S) : Kaga et al.

Page 1 of 1

It is certified that error appears in the above-identified patent and that said Letters Patent is hereby corrected as shown below:

Column 12, line 26, "nr's" should read -- nR's --; and
line 40, "ishydrogen" should read -- is hydrogen --.

Column 13, line 46, "hydrogen atom or a hydrogen" should read -- hydrogen atom or a hydrocarbon --.

Column 15 (claim 31) the uppermost formula:

Signed and Sealed this

Thirtieth Day of June, 2009

JOHN DOLL
*Acting Director of the United States Patent and Trademark Office*